(12) United States Patent
Wang

(10) Patent No.: US 8,422,204 B2
(45) Date of Patent: Apr. 16, 2013

(54) SLIDE ELECTRONIC DEVICE

(75) Inventor: Li-Chun Wang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 319 days.

(21) Appl. No.: 12/911,001

(22) Filed: Oct. 25, 2010

(65) Prior Publication Data

US 2012/0026650 A1     Feb. 2, 2012

(30) Foreign Application Priority Data

Jul. 28, 2010    (TW) ................................ 99214333 U

(51) Int. Cl.
     *G06F 1/16*      (2006.01)
(52) U.S. Cl.
     USPC .................................. 361/679.01; 455/575.4
(58) Field of Classification Search ............. 361/679.01; 455/575.4
See application file for complete search history.

(56) References Cited

U.S. PATENT DOCUMENTS

| | | | |
|---|---|---|---|
| 7,065,835 B2 * | 6/2006 | Kuramochi | 16/357 |
| 7,986,983 B2 * | 7/2011 | Harmon et al. | 455/575.4 |
| 7,986,984 B2 * | 7/2011 | Ou | 455/575.4 |
| 8,018,714 B2 * | 9/2011 | Luke et al. | 361/679.01 |
| 8,183,459 B2 * | 5/2012 | Wei et al. | 174/50 |
| 8,199,475 B2 * | 6/2012 | Yeh et al. | 361/679.27 |
| 8,208,244 B2 * | 6/2012 | Wu et al. | 361/679.01 |
| 8,213,163 B2 * | 7/2012 | Wu et al. | 361/679.01 |
| 8,233,276 B2 * | 7/2012 | Wu et al. | 361/679.55 |
| 8,248,766 B2 * | 8/2012 | Wu et al. | 361/679.01 |
| 8,248,788 B2 * | 8/2012 | Wu et al. | 361/679.55 |
| 8,259,443 B2 * | 9/2012 | Wu et al. | 361/679.56 |
| 8,289,706 B2 * | 10/2012 | Wu et al. | 361/679.56 |
| 2008/0161075 A1 * | 7/2008 | Kim et al. | 455/575.4 |
| 2010/0285852 A1 * | 11/2010 | Stephenson | 455/575.4 |
| 2010/0328856 A1 * | 12/2010 | Ojanto et al. | 361/679.01 |
| 2011/0143824 A1 * | 6/2011 | Laine | 455/575.4 |
| 2011/0157784 A1 * | 6/2011 | Wu et al. | 361/679.01 |
| 2011/0176262 A1 * | 7/2011 | Wu et al. | 361/679.01 |
| 2011/0195760 A1 * | 8/2011 | Carmonius et al. | 455/575.4 |

\* cited by examiner

*Primary Examiner* — Lisa Lea Edmonds
(74) *Attorney, Agent, or Firm* — Altis Law Group, Inc.

(57) ABSTRACT

A slide electronic device includes a first body, a second body, and a slide mechanism. The slide mechanism includes a first connecting member and a second connecting member. One end of the first connecting member is pivotally connected to the first body, an opposite end is pivotally connected to the second body, one end of the second connecting member is pivotally connected to the first body, and an opposite end is pivotally connected to the second body. A distance between rotary axes of the two ends of the first connecting member exceeds that of the second connecting member. When the second body slides relative to the first body, the first connecting member and the second connecting member are rotated relative to the first body and the second body until an end of the second body resists the first body and the second body is angled.

9 Claims, 6 Drawing Sheets

SLIDE ELECTRONIC DEVICE

BACKGROUND

1. Technical Field

The present disclosure relates to electronic devices, and particularly, to a slide electronic device.

2. Description of Related Art

Among portable electronic devices such as mobile phones and personal digital assistants (PDAs), the slide form factor is popular, in which one housing slides relative to the other by a mechanism to open or close the portable electronic device.

However, the slide electronic devices typically only allow the two housings to slide parallel to each other. Therefore, when the slide portable electronic device is positioned horizontally, it is difficult to view a display positioned on one of the housings.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the views.

DETAILED DESCRIPTION

Figure 1:
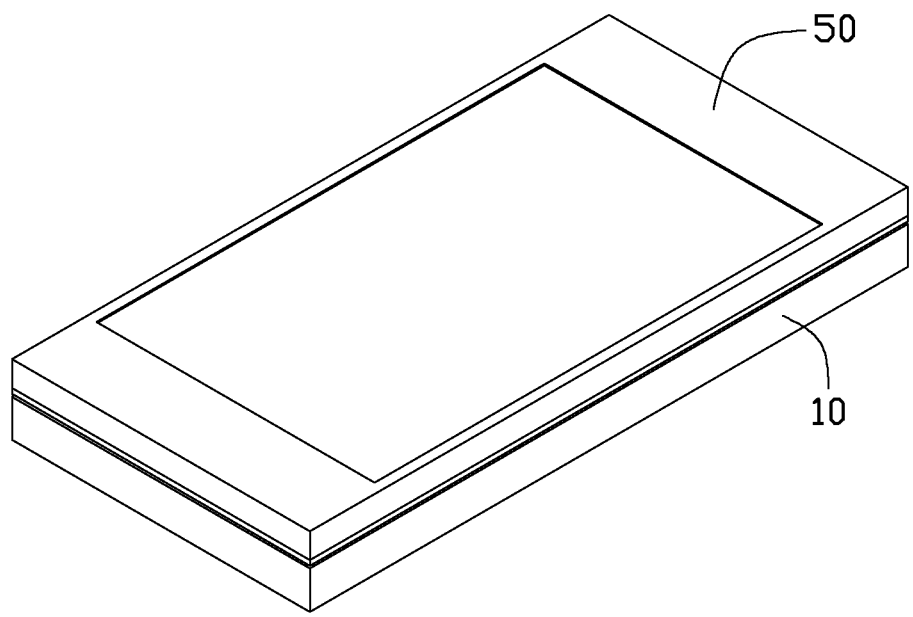
FIG. 1 is an assembled isometric view of one embodiment of a slide electronic device including a first body and a second body.
Figure 2:
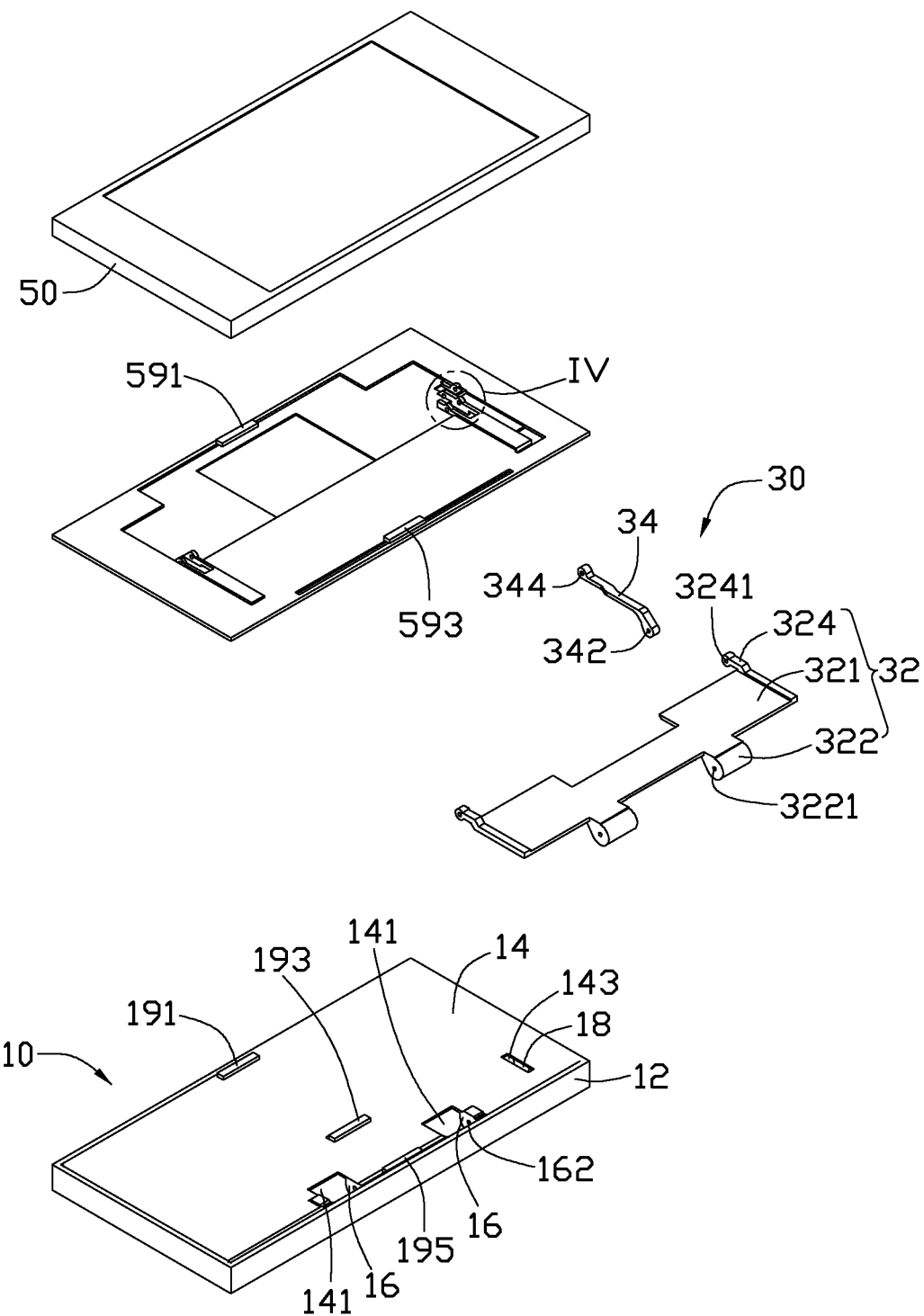
FIG. 2 is an exploded isometric view of the slide electronic device of FIG. 1.

Referring to FIG. 1 and FIG. 2, an embodiment of a slide electronic device 100 includes a first body 10, a slide mechanism 30, and a second body 50. The first body 10 is slidably coupled with the second body 50 via the slide mechanism 30.

The first body 10 includes a first housing 12, a first cover 14, four first pivot portions 16, two second pivot portions 18, a first positioning member 191, a second positioning member 193, and a third positioning member 195. The first housing 12 defines an opening (not labeled), and the first cover 14 is mounted to the first housing 12 and covers the opening. The first cover 14 defines a pair of receiving grooves 141 and a notch 143. Both of the receiving grooves 141 are defined at an edge of the first cover 14 and spaced apart. The notch 143 is defined at a corner of the first cover 14 adjacent to one of the receiving grooves 141.

Each first pivot portion 16 extends from the first cover 14 toward an inner side of the first housing 12. Each first pivot portion 16 defines a first pivot hole 162. Four first pivot portions 16 are divided into two pairs, each extending from opposite sides of each receiving groove 141. The second pivot portions 18 extend from opposite sides of the notch 143 towards the inner side of the first housing 12. It should be pointed out that there can be just one first portion 16 and one second pivot portion 18 extending from one side of each receiving groove 141 and the notch 143.

The first, second, and third positioning members 191, 193, 195 are substantially aligned. The third positioning member 195 is mounted on the edge of the first cover 14 between the pair of the receiving grooves 141. The first positioning member 191 is mounted on an opposite edge of the first cover 14. The second positioning member 193 is located at the center of the first cover 14 adjacent to the third positioning member 195. In the illustrated embodiment, the first, second, and third positioning members 191, 193, 195 are magnets. It should be pointed out that the first, second, and third positioning members 191, 193, 195 may be made of magnetically conductive materials in an alternative embodiment.

The slide mechanism 30 includes a first connecting member 32 and a second connecting member 34. The first connecting member 32 includes a plate 321, a pair of first shaft portions 322, and a pair of second shaft portions 324. The plate 321 is substantially rectangular. Each of the first shaft portions 322 extends from an edge of the plate 321 corresponding to the receiving grooves 141. Each first shaft portion 322 defines a first shaft hole 3221 extending substantially parallel to the edge of the plate 321. The second shaft portions 324 extend from an opposite edge of the plate 321, at opposite ends of the plate 321. Each second shaft portion 324 defines a second shaft hole 3241 extending substantially parallel to the plate 321.

The second connecting member 34 is a curved bar defining a first hinged hole 342 and a second hinged hole 344 at two ends thereof. Axes of the first hinged hole 342 and the second hinged hole 344 are substantially parallel to each other. A distance between rotary axes of the first hinged hole 342 and the second hinged hole 344 is unequal to that of the first shaft hole 3221 and the second shaft hole 3241. In the illustrated embodiment, a distance between rotary axes of the first hinged hole 342 and the second hinged hole 344 is less than that of the first shaft hole 3221 and the second shaft hole 3241. It should be pointed out that the distance between the rotary axes of the first hinged hole 342 and the second hinged hole 344 may exceed that of the first shaft hole 3221 and the second shaft hole 3241 in an alternative embodiment.

Figure 3:
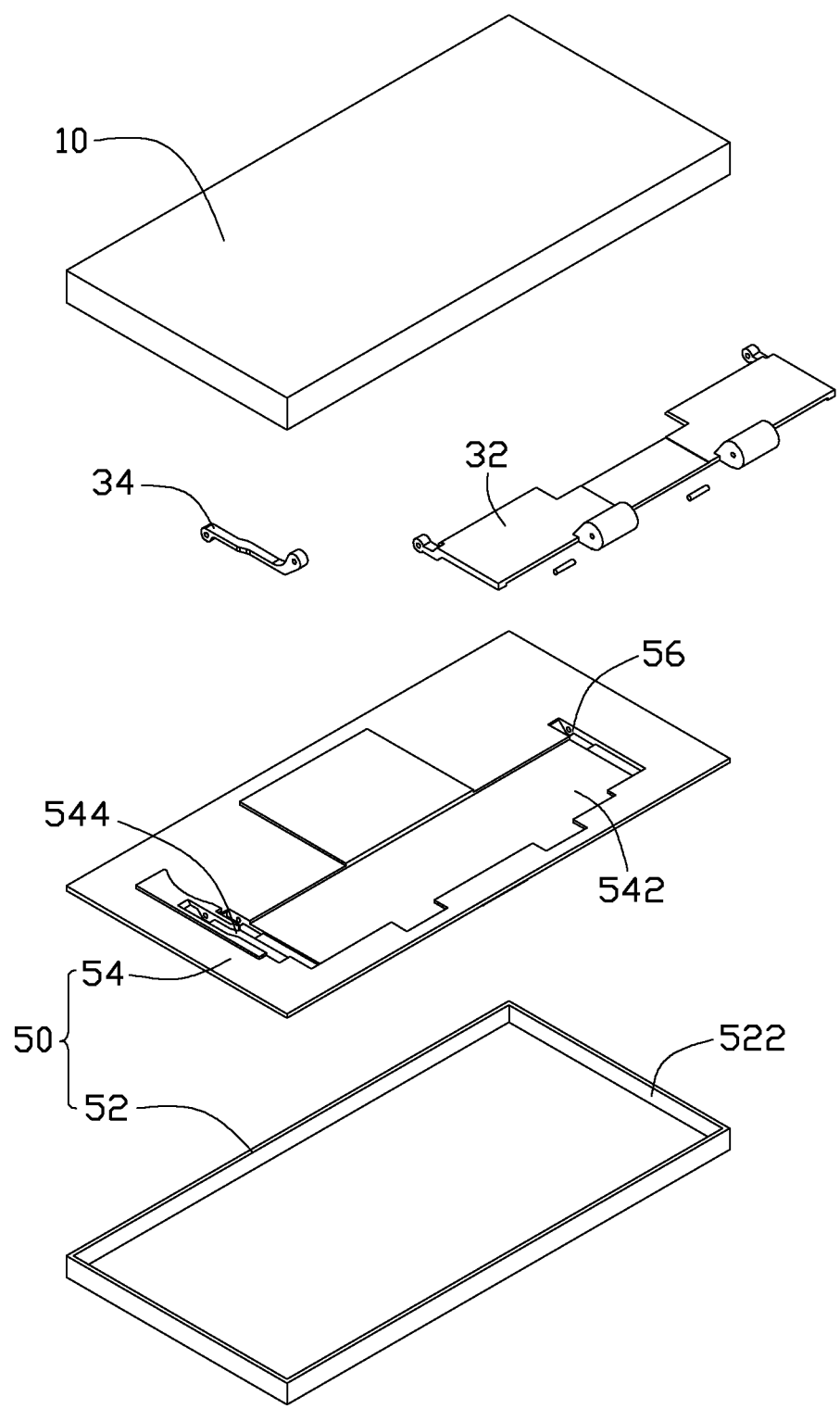
FIG. 3 is similar to FIG. 2, but viewed from another aspect.
Figure 4:
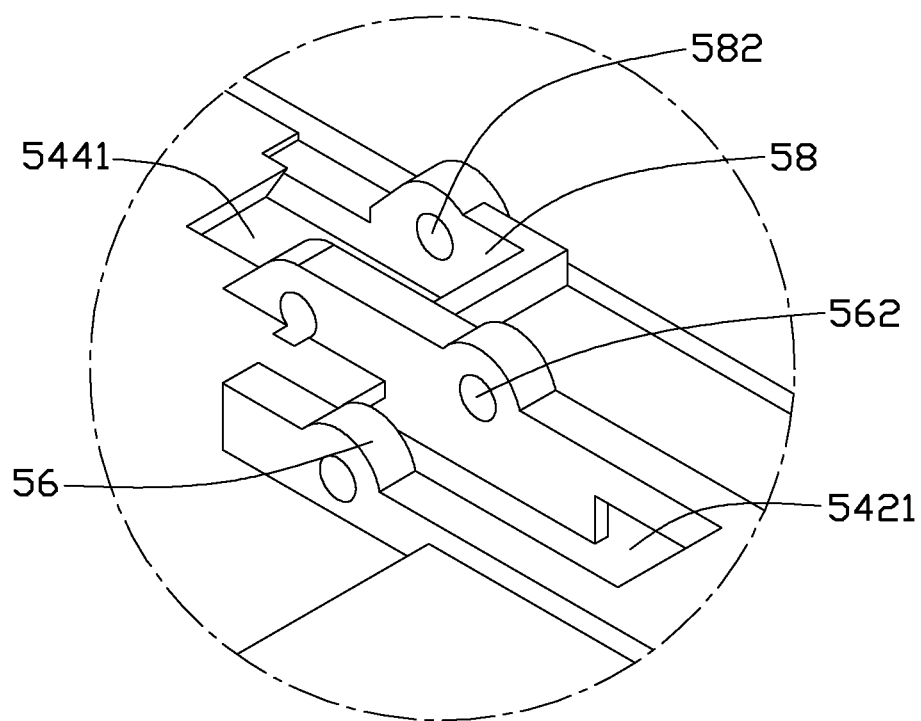
FIG. 4 is an enlarged view of a circled portion IV of FIG. 2.

Referring to FIG. 3 and FIG. 4, the second body 50 includes a second housing 52, a second cover 54, four first connecting portions 56, two second connecting portions 58 (see FIG. 4), a first tab 591, and a second tab 593. The second housing 52 is substantially a box defining an opening 522. The second cover 54 is mounted on the second housing 52 and covers the opening 522. The second cover 54 defines a first receiving chamber 542 corresponding to the first connecting member 32, and a second receiving chamber 544 corresponding to the second connecting member 34. Both of the first receiving chamber 542 and the second receiving chamber 544 are depressed from a surface of the second cover 54 away from the second housing 52. The first receiving chamber 542 defines a pair of first through holes 5421 corresponding to the second shaft portions 324. Four first connecting portions 56 are divided into two pairs, and each pair of the first connecting portions 56 extend from opposite sides of each first through hole 5421 toward the inner side of the second housing 52. Each first connecting portion 56 defines a connecting hole 562. The second receiving chamber 544 defines a second through hole 5441 at an end of the second receiving chamber 544 adjacent to the first through hole 5421. The pair of the second connecting portions 58 extends from opposite sides of the second through hole 5441 toward the inner side of the second housing 52. It should be pointed out that there may be only one first connecting portion 56 and one second connecting portion 58 extending from each first through hole 5421 and each second through hole 5441.

The first tab 591 and the second tab 593 are positioned on opposite ends of the second cover 54 corresponding to the first positioning member 191 and the third positioning member 195. The first tab 591 and the second tab 593 are made of magnetically conductive material, attracted to the first, second, and third positioning members 191, 193, 195. It should be pointed out that the first tab 591 and the second tab 593 may be magnets, as long as the first tab 591 is capable of locking with the first positioning member 191 and the second positioning member 193, the second tab 593 is capable of locking with the third positioning member 195.

In assembly, the first shaft portions 322 of the first connecting member 32 are received in the corresponding receiving grooves 141 and pivotally connected to the first pivot portions 16. The second shaft portions 324 are received in the first through holes 5421 correspondingly, and pivotally connected to the first connecting portions 56. An end of the second connecting member 34 defining the first hinged hole 342 is pivotally connected to the second pivot portions 18. An end of the second connecting member 34 defining the second hinged hole 344 is received in the second through hole 5441 and pivotally connected to the second connecting portions 58. The second cover 54 is fixed to the second housing 52 and covers the opening 522.

When the electronic device 100 is closed, the second body 50 covers the first body 10, the first connecting member 32 is received in the first receiving chamber 542, and the second connecting member 34 is received in the second receiving chamber 544. The first tab 591 and the second tab 593 are respectively attracted by the first positioning member 191 and the third positioning member 195.

Figure 5:
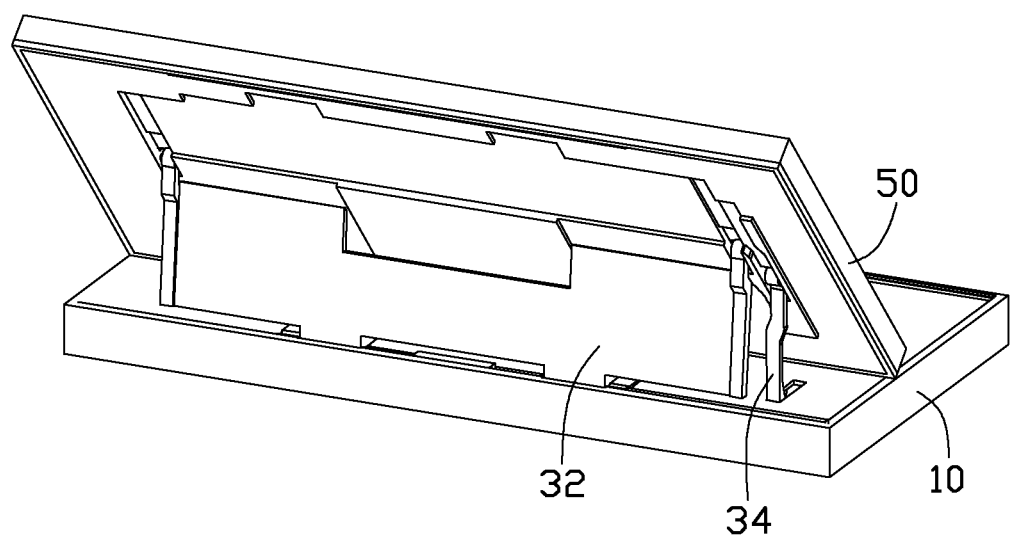
FIG. 5 is an assembled isometric view of the electronic device of FIG. 1 in an open state.
Figure 6:
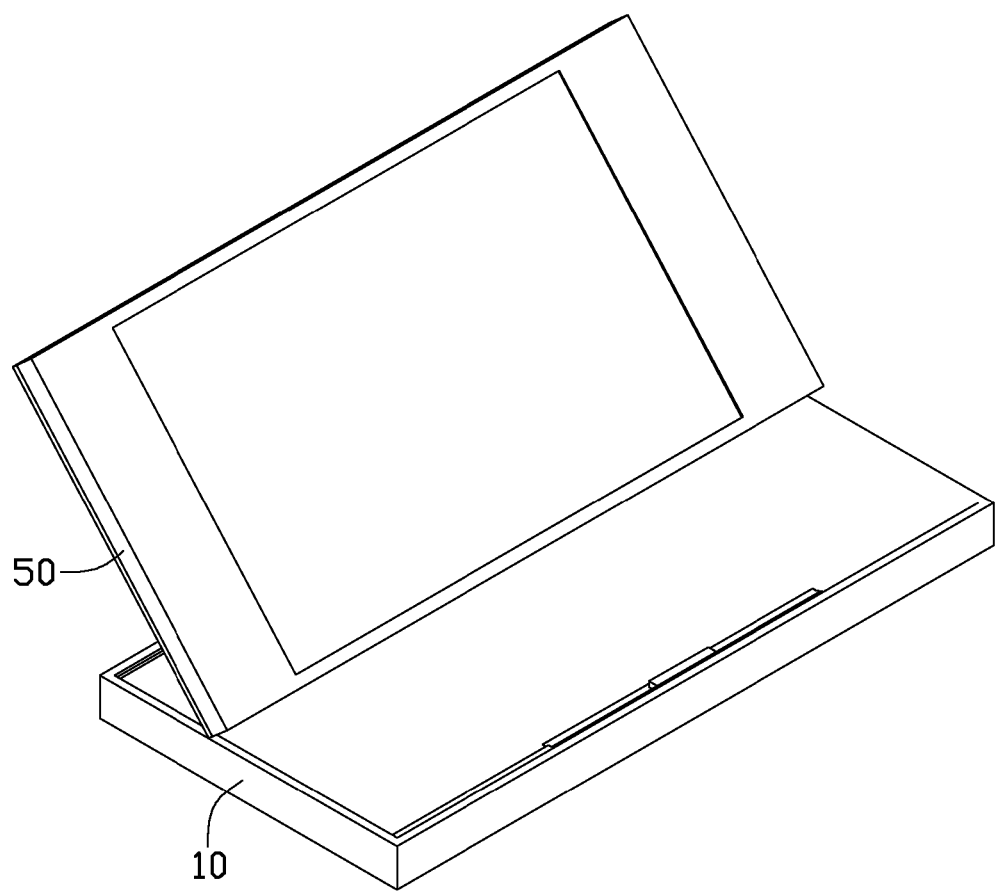
FIG. 6 is similar to FIG. 5, but viewed from another aspect.

Referring to FIG. 5 and FIG. 6, to open the second body 50 relative to the first body 30, an external force is applied on the end of the second body 50 on which the first tab 591 is positioned. The second body 50 then slides relative to the first body 10 to rotate the first connecting member 32 and the second connecting member 34 around the rotary axes of the first shaft hole 3221 and the second hinged hole 344. Because the distance between rotary axes of the first hinged hole 342 and the second hinged hole 344 is less than that of the first shaft hole 3221 and the second shaft hole 3241, rotary angles of the first connecting member 32 and the second connecting member 34 are different. Thus the second body 50 is angularly adjusted relative to the first body 10 until the end of the second body 50 resists the first body 10. The first tab 591 is attracted by the second positioning member 193, thus the second body 50 is kept open and angled relative to the first body 10.

In order to close the second body 50 relative to the first body 10, external force applied on an end of the second body 50 on which the second tab 593 is positioned rotates the second body 50 relative to the first body 10, such that the second body 50 overlaps the first body 10. At the same time, the first tab 591 and the second tab 593 are respectively attracted by the first positioning member 191 and the third positioning member 195, thus the second body 50 is locked to the first body 10.

When the second body 50 is open, the second body 50 is supported at an angle, facilitating view of a display positioned on the second body 50. During opening of the second body 50 relative to the first body 10, no physical contact is made between the second body 50 and the first body 10 until the end of the second body 50 resists the first body 10, thus avoiding abrasion of the slide electronic device 100.

The second body 50 is kept angled open or closed relative to the first body 10 by magnetic force, such that the slide electronic device 100 requires no use of elastic assembly, simplifying structure and manufacture at minimal cost.

Angling of the second body 50 relative to the first body 10 may be adjusted by adjusting the relative distance between axes of the first hinged hole 342 and the second hinged hole 344, and that of the first shaft hole 3221 and the second shaft hole 3241.

In an alternative embodiment, the second tab 593 and the second positioning member 195 may be omitted, whereby when the second body 50 is closed relative to the first body 10, the first tab 593 is attracted by the first positioning member 191 to lock the second body 50 to the first body 10. The first positioning member 191, the second positioning member 193, and the first tab 593 may be omitted, whereby one of the first connecting member 32 and the second connecting member 34 is fractionally pivotally connected to the first body 10 and the second body 50. One or more first shaft portions 322 and second shaft portions 324, rather than two, such as one first shaft portions 322 and one second shaft portions 324 may be formed at opposite edges of the plate 321, and the number of receiving grooves 141 and first through holes 5421 changed accordingly.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A slide electronic device, comprising:
   a first body comprising a first positioning member and a second positioning member;
   a second body comprising a cover and a first tab positioned at an end of the cover resisting the first body; and
   a slide mechanism comprising a first connecting member and a second connecting member, wherein one end of the first connecting member is pivotally connected to the first body, an opposite end of the first connecting member is pivotally connected to the second body, one end of the second connecting member is pivotally connected to the first body, an opposite end of the second connecting member is pivotally connected to the second body, a distance between rotary axes of the two ends of the first connecting member exceeds a distance between rotary axes of the two opposite ends of the second connecting member, wherein when the second body is slid relative to the first body, both of the first connecting member and the second connecting member are rotated relative to the first body and the second body until an end of the second body resists the first body, such that the second body is angled with respect to the first body, when the second body is closed relative to the first body, the first positioning member locks with the first tab, and when the second body is opened relative to the first body, the first tab locks with the second positioning member.

2. The slide electronic device of claim 1, wherein the first positioning member and the second positioning member are selected from magnets and magnetically conductive material, the first tab and the first positioning member attract each other, and the first tab and the second positioning member attract each other.

3. The slide electronic device of claim 1, wherein the second body further comprises a second tab positioned at an opposite end of the second body, the first body further comprises a third positioning member corresponding to the second tab, whereby when the second body is closed relative to the first body, the second tab locks with the third positioning member.

4. The slide electronic device of claim 3, wherein the first positioning member, the second positioning member, and the third positioning member are magnets and members of magnetically conductive materials, whereby the first tab and the first positioning member attract each other, the first tab and the second positioning member attract each other, and the third tab and the third positioning member attract each other.

5. The slide electronic device of claim 1, wherein the first body comprises a first housing and a first cover, the first housing defining an opening covered by the first cover, the second body further comprising a second housing, and the second housing defines an opening covered by the cover.

6. The slide electronic device of claim 5, wherein the first connecting member comprises a plate, at least one first shaft portion extending from an edge of the plate, and at least one second shaft portion extending from an opposite edge of the plate, the first body comprises at least one first pivot portion positioned on the first cover pivotally connected to the at least one first shaft portion, and the second body comprises at least one first connecting portion positioned on the cover pivotally connected to the at least one second shaft portion.

7. The slide electronic device of claim 6, wherein the first cover further defines at least one receiving groove corresponding to the at least one first shaft portion, the at least one first pivot portion extending from one side of the corresponding at least one receiving groove toward the inner side of the first housing, the at least one first shaft portion being received in the corresponding at least one receiving groove; the second body defines a first receiving chamber for the plate and the at least one second shaft portion; the first receiving chamber defines at least one first through hole corresponding to the at least one second shaft portion; the at least one first connecting portion extends from one side of the corresponding at least one first through hole toward the inner side of the second housing, and the at least one second portion is received in the corresponding at least one first through hole.

8. The slide electronic device of claim 7, wherein the cover further comprises a second receiving chamber for the second connecting member.

9. The slide electronic device of claim 8, wherein the second receiving chamber defines a second through hole, the second body further comprises a second connecting portion extending from one side of the second through hole toward the second housing, an end of the second connecting member is received in the second through hole and pivotally connected to the second connecting portion, the first cover defines a notch, the first body further comprises a second pivot portion extending from one side of the notch toward the first housing, and an opposite end of the second connecting member is received in the notch and pivotally connected to the second pivot portion.

* * * * *